(12) United States Patent
Sakai et al.

(10) Patent No.: US 10,899,194 B2
(45) Date of Patent: Jan. 26, 2021

(54) AIR-CONDITIONING CONTROL APPARATUS

(71) Applicant: DENSO CORPORATION, Kariya (JP)

(72) Inventors: Koji Sakai, Kariya (JP); Shinsuke Konishi, Kariya (JP); Hiromitsu Maehata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/675,057

(22) Filed: Nov. 5, 2019

(65) Prior Publication Data

US 2020/0070626 A1    Mar. 5, 2020

Related U.S. Application Data

(63) Continuation of application No. PCT/JP2018/017718, filed on May 8, 2018.

(30) Foreign Application Priority Data

May 9, 2017 (JP) ................. 2017-093037
Jun. 5, 2017 (JP) ................. 2017-111018
Jan. 18, 2018 (JP) ................. 2018-006226

(51) Int. Cl.
  *B60H 1/00* (2006.01)
  *B60N 2/00* (2006.01)

(52) U.S. Cl.
  CPC ..... *B60H 1/00742* (2013.01); *B60H 1/00764* (2013.01); *B60N 2/002* (2013.01)

(58) Field of Classification Search
  CPC .................. B60H 2/00742; B60H 1/00764
  See application file for complete search history.

(56) References Cited

U.S. PATENT DOCUMENTS

| 6,357,244 | B1 | 3/2002 | Mori |
| 9,682,609 | B1* | 6/2017 | Dudar ............... B60H 1/00764 |
| 2004/0194479 | A1 | 10/2004 | Umebayashi et al. |
| 2015/0041113 | A1* | 2/2015 | Enke ............... B60H 1/00392 |
| | | | 165/202 |

FOREIGN PATENT DOCUMENTS

| JP | H08207549 A | 8/1996 |
| JP | H09293194 A | 11/1997 |
| JP | 2000264039 A | 9/2000 |

(Continued)

OTHER PUBLICATIONS

English Translation of JP-2001001787-A (Year: 2001).*
U.S. Appl. No. 16/675,032, filed Nov. 5, 2019, Sakai.

*Primary Examiner* — Marc E Norman
*Assistant Examiner* — Schyler S Sanks
(74) *Attorney, Agent, or Firm* — Harness, Dickey & Pierce, P.L.C.

(57) ABSTRACT

An air-conditioning control apparatus for a vehicle capable of unmanned driving includes a determining section that is configured to determine whether an occupant is in the vehicle and an output section that is configured to execute an air-conditioning control based on a determination result by the determining section. The output section is configured to execute the air-conditioning control based on ride schedule information indicating a length of time until an occupant rides in the vehicle when the vehicle is determined to be in an unmanned state.

10 Claims, 10 Drawing Sheets

(56) References Cited

FOREIGN PATENT DOCUMENTS

| | | | | |
|---|---|---|---|---|
| JP | 2001001787 | A | * | 1/2001 |
| JP | 2001043498 | A | | 2/2001 |
| JP | 2001063347 | A | | 3/2001 |
| JP | 2004256092 | A | | 9/2004 |
| JP | 2012012012 | A | | 1/2012 |
| JP | 2012073979 | A | | 4/2012 |

* cited by examiner

AIR-CONDITIONING CONTROL APPARATUS

CROSS REFERENCE TO RELATED APPLICATIONS

This application is a continuation application of international Patent Application No. PCT/JP2018/017718 filed on May 8, 2018, which designated the U.S. and claims the benefit of priority from Japanese Patent Application No. 2017-093037 filed on May 9, 2017, and Japanese Patent Application No. 2017-111018 filed on Jun. 5, 2017, and Japanese Patent Application No. 2018-006226 filed on Jan. 18, 2018. The entire disclosure of all of the above applications are incorporated herein by reference.

TECHNICAL FIELD

The present disclosure relates to an air-conditioning control apparatus mounted in a vehicle capable of unmanned driving.

BACKGROUND ART

A control apparatus operates a compressor for air conditioning during manned travel, and stops the compressor for air conditioning or the like during unmanned travel. In vehicles that perform unmanned travel, it has been requested to enhance the fuel economy by performing an efficient air-conditioning operation, for example, avoiding unnecessary air-conditioning.

SUMMARY

One aspect of the present disclosure is an air-conditioning control apparatus that is mounted in a vehicle capable of unmanned driving. The apparatus includes a determining section that is configured to determine whether an occupant is in the vehicle, and an output section that is configured to execute an air-conditioning control based on a determination result by the determining section. The output section is configured to execute the air-conditioning control based on ride schedule information indicating a length of time until an occupant rides in the vehicle when the determination result by the determining section indicates the vehicle is in an unmanned state.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Hereinafter, embodiments of the present invention will be described by referring to attached drawings. For ease of understanding of the description, the same constituent in different drawings is denoted by the same symbol as much as possible, and overlapping description is omitted.

A typical air-conditioning operation is stopped by stopping a compressor for air-conditioning when it is determined that the vehicle performs unmanned travel. Therefore, plenty of time and energy is required to complete the air-conditioning to have a cabin space comfortable for an occupant in the vehicle after the unmanned travel. Also plenty of energy is consumed by the air-conditioning operation if the air-conditioning operation is always performed during unmanned driving. In the aforementioned viewpoint, or in other viewpoint that has not been described, further improvement is needed for a vehicle air-conditioning apparatus.

First Embodiment

A vehicle air-conditioning apparatus 1 is mounted in a vehicle. The vehicle air-conditioning apparatus 1 provides air-cooling, heating and/or ventilation inside a cabin. The vehicle air-conditioning apparatus 1 performs air-cooling and heating by sending temperature-controlled air-conditioning wind into the cabin. The vehicle air-conditioning apparatus 1 performs ventilation by discharging the air inside the cabin and taking air outside the cabin into the cabin.

Driving of the vehicle is controlled by a vehicle control apparatus (hereinafter, indicated by vehicle ECU) 10. In other words, the vehicle ECU 10 controls traveling of the vehicle, and controls a cooling system required for traveling of the vehicle.

Figure 1:
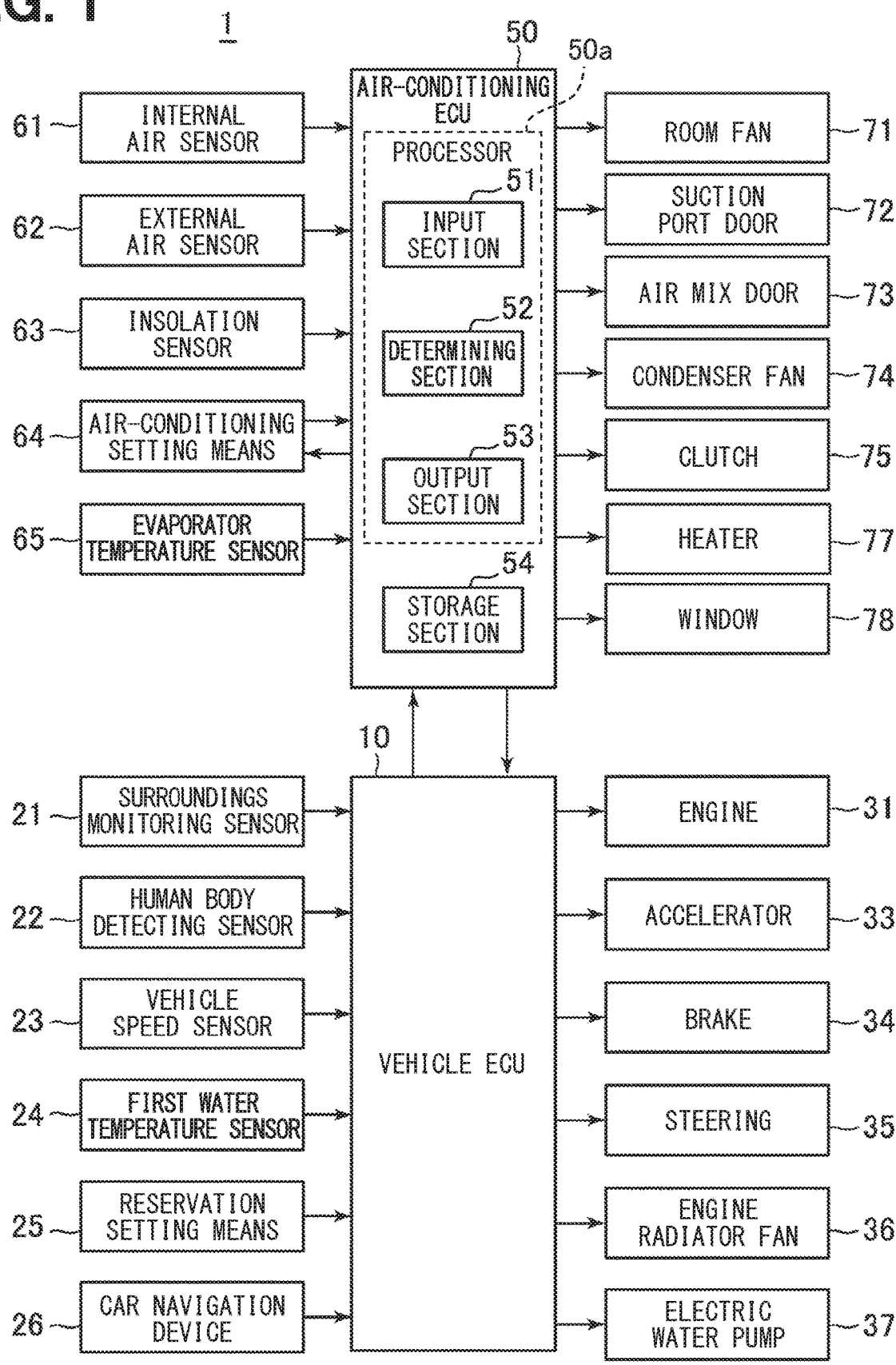
FIG. 1 is a block diagram of a vehicle air-conditioning apparatus.

In FIG. 1, a surroundings monitoring sensor 21, a human body detecting sensor 22, a vehicle speed sensor 23, a first water temperature sensor 24, a reservation setting means 25, and a car navigation device 26 are connected to the vehicle ECU 10. To the vehicle ECU 10, a signal which is a detection result from each of connected components is inputted.

The surroundings monitoring sensor 21 is a sensor for acquiring data about an external environment in the surroundings of the vehicle. The surroundings monitoring sensor 21 is a camera facing in the frontward direction of the vehicle, namely the traveling direction of the vehicle. The surroundings monitoring sensor 21 may be a radar that detects the presence or absence of an obstacle in front of the vehicle. As the surroundings monitoring sensor 21, both of a camera and a radar may be used. The vehicle ECU 10 acquires data required for unmanned travel control of the vehicle such as external environmental data of the surroundings of the vehicle using the surroundings monitoring sensor 21.

The human body detecting sensor 22 is an unmanned determining means that determines whether the inside of the cabin is in an unmanned state or a manned state. The human body detecting sensor 22 is a seating sensor that is disposed on a seat and determines whether the seat is in a manned state in response to the load applied by an occupant sitting on the seat. The seating sensor is individually provided for each of a plurality of seats in the cabin, and detects which seat an occupant sits. The human body detecting sensor 22 is not necessarily limited to a seating sensor. The human body detecting sensor 22 may be a seat belt sensor that detects wearing of the seat belt. The human body detecting sensor 22 may be an infrared sensor that detects an infrared ray radiated from a human body. The infrared sensor is capable of determining whether inside the cabin is in a manned state even when an occupant does not sit on a seat.

The vehicle speed sensor 23 is a sensor that detects a traveling speed of the vehicle. The vehicle speed sensor 23 is disposed on a wheel of the vehicle, and detects the rotational speed of the wheel. Thus, the vehicle speed which is a traveling speed of the vehicle can be calculated.

The first water temperature sensor 24 is a temperature sensor disposed in the vicinity of an outlet of an engine 31 in a circulating path of the engine cooling water. The first water temperature sensor 24 detects the temperature of the engine cooling water directly after the temperature is raised through heat exchange by the engine 31.

The reservation setting means 25 is an operation means with which a user make a reservation of the vehicle. The vehicle ECU 10 controls automatic driving of the vehicle to a designated place at a designated time that are preliminarily designated by reservation setting. The reservation setting means 25 is a communication terminal outside the cabin such as a smartphone or a PC. The reservation setting means 25 may be an operation terminal provided inside the cabin. In this case, an occupant on the vehicle makes reservation setting by inputting information about the next scheduled ride time and scheduled ride place. In the reservation setting means 25, information such as a target temperature in the cabin, and on or off of music in the cabin can also be set. The car navigation device 26 determines an optimum traveling route and calculates an expected required time using information about the set destination and the information about the current location of the vehicle acquired by GPS. The required time to the destination is calculated by dividing distance information, which is calculated by magnifying the direct distance from the current location to the destination by a detour coefficient, by speed information (for example, a speed of 40 km per hour). In calculation of the required time, traffic jam information may be acquired, and correction to extend the required time, for example, may be made when a traffic jam occurs.

To the vehicle ECU 10, an engine 31, an accelerator 33, a brake 34, and a steering 35 that are devices required for traveling are connected. To the vehicle ECU 10, an engine radiator fan 36 which is a cooling device required for traveling, and an electric water pump 37 are connected. The vehicle ECU 10 outputs a signal that controls each of the connected components.

The engine 31 is a power source for the vehicle to travel. The engine 31 is an internal combustion engine that obtains power by combustion gas generated when fuel is burnt. The power generated by the engine 31 is also used as power for the compressor that compresses a coolant and makes the coolant circulate in the heat exchanger for air-cooling in the air-conditioning apparatus.

The accelerator 33 is a device that accelerates the vehicle. The brake 34 is a device that decelerates the vehicle. The vehicle ECU 10 controls the vehicle speed by accelerating or decelerating the vehicle by controlling the accelerator 33 and the brake 34.

The steering 35 is a device that controls the orientation of tires. The vehicle ECU 10 controls the traveling direction of the vehicle by controlling the steering 35.

The engine radiator fan 36 is an air blower that sends air to the engine radiator which is a radiator in which the engine cooling water circulates. The engine radiator fan 36 is provided in front of the engine radiator disposed in a front part of the vehicle. In other words, the engine radiator fan 36 is disposed facing the engine radiator. The engine radiator fan 36 sends air from the front part toward the rear part of the vehicle. In other words, the air is sent in the same direction as the direction of the traveling wind received by the traveling vehicle.

The vehicle ECU 10 is connected with the electric water pump 37. The electric water pump 37 is a pump driven as power for circulating the engine cooling water that cools the engine 31 which is vehicle power. The electric water pump 37 is controlled by the vehicle ECU 10 regarding on/off of its driving and the intensity of the output.

Besides the above, the vehicle ECU 10 controls various devices used for traveling including a transmission, a headlight, a winker, and a wiper. The vehicle ECU 10 is connected with an air-conditioning control apparatus (hereinafter, referred to as an air-conditioning ECU) 50 that performs control on an air-conditioning operation, in a mutually communicable manner.

The air-conditioning ECU 50 includes at least one processor 50a. The air-conditioning ECU 50 performs various calculations by executing programs stored in a storage medium (a storage section 54 as described below). As shown in FIG. 1, the air-conditioning ECU 50 has multiple functional blocks including an input section 51, a determining section 52, an output section 53, and a storage section 54. The input section 51 receives a signal outputted from each of connected devices such as a sensor. The determining section 52 performs an operation based on the information inputted into the input section 51 and determines the air-conditioning control content. The output section 53 transmits the air-conditioning control content determined by the determining section 52 to each of connected devices that are to be controlled. The storage section 54 stores information received by the input section 51 or a determination result determined by the determining section 52.

To the air-conditioning ECU 50, an internal air sensor 61, an external air sensor 62, an insolation sensor 63, an air-conditioning setting means 64, and an evaporator temperature sensor 65 are connected. To the air-conditioning ECU 50, a signal which is a detection result from each of connected devices is inputted.

The internal air sensor 61 is a temperature sensor that measures the temperature in the cabin. The internal air sensor 61 is disposed in an instrument panel inside the cabin. The external air sensor 62 is a temperature sensor that measures the temperature outside the cabin. The external air sensor 62 is disposed on the back side of the front bumper where the sensor is less likely to be influenced by a hot air inside the engine room. The insolation sensor 63 is a sensor that measures the irradiance of the sunlight applied to the vehicle. The insolation sensor 63 is disposed on the top face of the dashboard.

The air-conditioning setting means 64 is an operation panel on which an occupant can set a target temperature in the cabin, power of the blowing air flow and the like. The air-conditioning setting means 64 is disposed inside the cabin. The air-conditioning setting means 64 is operable by an occupant during traveling. The air-conditioning setting means 64 is not necessarily limited to an operation panel disposed inside the cabin. The air-conditioning setting means 64 may be a communication terminal outside the cabin such as a smartphone or a PC. The air-conditioning setting means 64 may be embodied by the same terminal as the reservation setting means 25 that allows both the air-conditioning setting and the reservation setting.

The air-conditioning ECU 50 calculates a target outlet air temperature, which is a target temperature of the air-conditioning wind around the outlet, from the measurement results of the internal air sensor 61, the external air sensor 62, and the insolation sensor 63, and information of the target temperature in the cabin inputted by the air-conditioning setting means 64 and so on. The air-conditioning ECU 50 performs an air-conditioning operation on the basis of the calculated target outlet air temperature.

The evaporator temperature sensor 65 is a temperature sensor that detects the temperature of the evaporator which is a heat exchanger for air-cooling. The evaporator temperature sensor 65 is disposed in the vicinity of outlet piping of the evaporator. The air-conditioning ECU 50 controls an air-cooling operation on the basis of the temperature of the evaporator measured in the evaporator temperature sensor 65.

To the air-conditioning ECU 50, a room fan 71, a suction port door 72, an air mix door 73, a condenser fan 74, a clutch 75, a heater 77, and a window 78 are connected. From the air-conditioning ECU 50, a signal that controls each of connected devices is outputted.

The room fan 71 is a fan that provides air-conditioning wind in the cabin. The room fan 71 provides air to the evaporator which is a heat exchanger for air-cooling, and to a heater core which is a heat exchanger for heating. The air after heat exchange with the evaporator and the heater core is blown into the cabin through the air outlet as air-conditioning wind. The air-conditioning ECU 50 performs an air-conditioning control by providing air-conditioning wind in the cabin by controlling the room fan 71.

The suction port door 72 is a door member that closes either one of an internal air suction port and an external air suction port. The suction port door 72 is a rotary door that rotates about the rotation axis to adjust the degree of opening. When the external air suction port is closed, the air-conditioning wind is circulated in the cabin. The mode in which the wind circulates inside the cabin is an internal air mode. When the internal air suction port is closed, the wind taken in from outside the cabin is sent in the cabin. The mode in which the wind is taken inside the cabin from outside the cabin is an external air mode.

The air mix door 73 is a door member that controls the ratio at which the wind having passed through the evaporator which is a heat exchanger for air-cooling, and the heater core which is a heat exchanger for heating are heat exchanged. The air mix door 73 is disposed in front of the heater core. The air mix door 73 is a plate door. When the air mix door 73 is closed to cover the entire front face of the heater core, the air-conditioning wind that has been heat exchanged only with the evaporator is sent inside the cabin. When the air mix door 73 is opened apart from the front face of the heater core, the air-conditioning wind that has been heat exchanged both with the evaporator and the heater core is sent inside the cabin.

The condenser fan 74 is an air blower that sends air to the condenser which is a heat radiator constituting a part of a refrigerating cycle for air-cooling. The condenser fan 74 is disposed in front of the condenser disposed in the front part of the vehicle. In other words, the condenser fan 74 is disposed facing the condenser. The condenser fan 74 sends air rearward from the front part of the vehicle. In other words, the air is sent in the same direction as the direction of the traveling wind received by the traveling vehicle. The condenser fan 74 and the engine radiator fan 36 are disposed adjacent to each other.

The clutch 75 is a coupling device that controls coupling between the engine 31 and the compressor constituting the refrigerating cycle for air-cooling. The clutch 75 is a magnet clutch that controls a coupling state and an uncoupling state by presence or absence of the magnet force. When an air-cooling operation is performed, the clutch 75 is brought into a coupling state. That is, the engine 31 and the compressor are coupled to drive the compressor using the engine 31 as power. In other words, the compressor is an air-conditioning apparatus that performs air conditioning using the engine 31 which is vehicle power as power. Therefore, when an air-cooling operation is performed while the vehicle is parked, it is necessary to drive the engine 31 so as to drive the compressor. On the other hand, when an air-cooling operation is not performed, the clutch 75 is brought into an uncoupling state. That is, the engine 31 is uncoupled from the compressor to make the compressor in an undriven state.

The heater 77 is a heat source for use in heating inside the cabin. The heater 77 is a PTC heater having such a property that the value of the electric resistance varies with a positive factor as the temperature increases. The heater 77 is a heater that is disposed additionally to the heater core, and contributes to heating inside the cabin. The air-conditioning ECU 50 energizes the heater 77 to raise the temperature when heating is necessary. The heater 77 may be a heater that contributes to heating. For example, a seat heater disposed on a seat may be employed.

The window 78 has a ventilation function for taking external air into the cabin. The window 78 is disposed on the upper part of the door that is opened or closed by an occupant to get on or off the vehicle. In a ventilation operation, the air-conditioning ECU 50 opens the window 78 to discharge the internal air outside while taking the external air into the cabin. The air-conditioning ECU 50 closes the window 78 after completion of the ventilation operation.

The air-conditioning ECU 50 controls each device so that the air-conditioning wind is blown out at a target outlet air temperature. That is, the air-conditioning ECU 50 controls the number of revolutions of the room fan 71. The air-conditioning ECU 50 controls switching of the suction port door 72. The air-conditioning ECU 50 controls the degree of opening of the air mix door 73. The air-conditioning ECU 50 controls the number of revolutions of the condenser fan 74. The air-conditioning ECU 50 controls switching between coupling and uncoupling of the clutch 75. The air-conditioning ECU 50 controls output of the heater 77. The air-conditioning ECU 50 controls opening or closing of the window 78.

Figure 2:
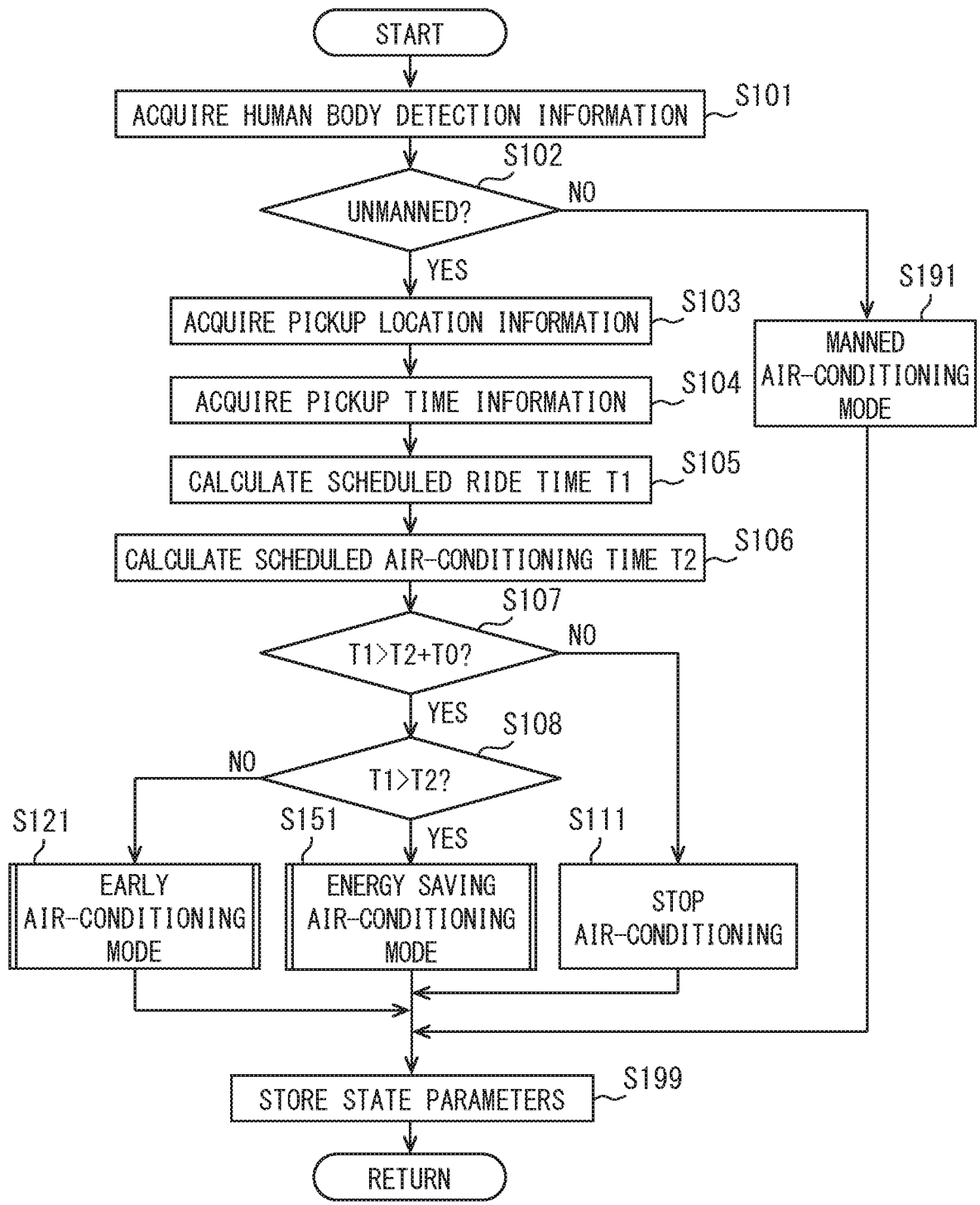
FIG. 2 is a flowchart regarding the control of the vehicle air-conditioning apparatus.

Next, the process of control by the vehicle air-conditioning apparatus 1 is described. The following process is performed by the processor 50a of the vehicle air-conditioning apparatus 1. In FIG. 2, when the vehicle air-conditioning apparatus 1 (i.e., the processor 50a) starts air-conditioning control, first, presence or absence of a person in the cabin is detected by using the human body detecting sensor 22 in step S101. After detecting the presence or absence of a person, the processor 50a determines whether the cabin is in an unmanned state in step S102. When it is determined to be in an unmanned state, the process proceeds to step S103. On the other hand, when it is determined not to be an unmanned state, the process proceeds to step S191.

In step S191, air-conditioning control is performed in a manned air-conditioning mode. That is, air-conditioning is performed so that the occupant currently in the vehicle feels comfortable. In other words, in the manned air-conditioning mode, air-conditioning operation is performed in consideration of factors of comfort other than the temperature such as noises. More specifically, in the manned air-conditioning mode, the operation intensity of the room fan 71 is made lower than the operation intensity of the room fan 71 during the unmanned state. In other words, the upper limit of the number of revolutions of the room fan 71 is set lower than that in the unmanned state. Also, the seat heater is used only during the manned air-conditioning mode. In this case, in the unmanned state, the seat heater is not energized, and after an occupant sits, the seat heater is energized to start. After executing the air-conditioning operation in the manned air-conditioning mode, the process proceeds to step S199 while the air-conditioning operation is maintained.

In step S103, pickup location information inputted by a user using the reservation setting means 25 is acquired. The pickup location information is included in ride schedule information indicating information that the vehicle is expected to be in a manned state. The pickup location information includes information of the address where an user intends to ride in the vehicle. The user may input a name of a building or a place and search the address, rather than directly inputting an address. Alternatively, a fixed pickup location may be preliminarily set as pickup location information, and the user may necessarily ride at the preset pickup position. In this case, the pickup location information is not inputted by the user, but acquired by reading out pickup location information preliminarily set. After acquiring the pickup location information, the process proceeds to step S104.

In step S104, the pickup time information inputted by the user is acquired via the reservation setting means 25. The pickup time information is included in the ride schedule information indicating information that the vehicle is expected to be in a manned state. The pickup time information is information indicating the time when the user intends to ride in the vehicle. The information is, for example, a time such as "19:30". The user may input an elapsed time from the current time rather than directly inputting a time. That is, an elapsed time of 30 minutes or the like may be inputted. Also, a user may input the current time rather than a future time. That is, a user who wants to ride as early as possible inputs the current time. In this case, as the pickup time information, the current time or a past time is acquired. After acquiring the pickup time information, the process proceeds to step S105.

The vehicle ECU 10 starts traveling control on the basis of the acquired pickup location information and pickup time information. That is, the vehicle ECU 10 conducts traveling control so that the vehicle arrives the pickup location by the pickup time. For example, when the current time is 19:00, the pickup time information is 19:30, and the pickup location information is set at the place that requires 15 minutes to reach from the current location, the vehicle waits at the current location until 19:15. Then, the vehicle starts traveling at 19:15 toward the pickup location. The traveling control may be conducted so that the vehicle arrives slightly earlier than the pickup time. However, even when the vehicle cannot arrive the pickup location by the pickup time, for example, when the current time is set as the pickup time information, the traveling control is conducted so that the vehicle can arrive the pickup location as early as possible.

In step S105, a scheduled ride time T1 is calculated. The scheduled ride time T1 is either the longer of the time required to move from the current location to the pickup location and the time difference from the current time to the pickup time. The time required to move from the current location to the pickup location is acquired from the car navigation device 26. For example, if the time required to move from the current location to the pickup location is 15 minutes, and the time difference from the current time to the pickup time is 1 hour, the scheduled ride time T1 is 1 hour. The time required to move from the current location to the pickup location may be calculated by the vehicle ECU 10 rather than being acquired from the car navigation device 26. Also, a communication device is provided, and the time required to move from the current location to the pickup location, calculated externally may be acquired. After calculation of the scheduled ride time T1, the process proceeds to step S106.

In step S106, a scheduled air-conditioning time T2 is calculated. The scheduled air-conditioning time T2 is a time required from starting of air-conditioning to completion of the air-conditioning. The scheduled air-conditioning time T2 is determined by a characteristics map stored in the air-conditioning ECU 50 using the temperature difference between the current temperature in the cabin measured by the internal air sensor 61 and the target temperature. The target temperature is the temperature in the cabin inputted by the user through the reservation setting means 25. The target temperature is, for example, 20° C. Regarding the scheduled air-conditioning time T2, the temperature difference between the temperature in the cabin and the target temperature may be determined by a function stored in the air-conditioning ECU 50 rather than by the characteristics map. The scheduled air-conditioning time T2 may not be calculated from the target temperature or the like, but a time that is sufficient to reach the target temperature may be preliminarily set as the scheduled air-conditioning time T2. In this case, the scheduled air-conditioning time T2 is a fixed time, for example, 30 minutes. After calculation of the scheduled air-conditioning time T2, the process proceeds to step S107.

In step S107, whether the scheduled ride time T1 is shorter than the total time of the scheduled air-conditioning time T2 and a buffer time T0 is determined. If the scheduled ride time T1 is shorter than the total time of the scheduled air-conditioning time T2 and the buffer time T0, the process proceeds to step S108. On the other hand, if the scheduled ride time T1 is longer than the total time of the scheduled air-conditioning time T2 and the buffer time T0, the process proceeds to step S111. Here, the buffer time T0 is a time to complete the air-conditioning earlier than the scheduled ride time T1. The buffer time T0 is, for example, 10 minutes. For example, when the scheduled air-conditioning time T2 is calculated as 20 minutes, the total time of the scheduled air-conditioning time T2 and the buffer time T0 is 30 minutes. Therefore, if the scheduled ride time T1 is less than 30 minutes, the process proceeds to step S108, whereas if the scheduled ride time T1 is more than 30 minutes, the process proceeds to step S111. The buffer time T0 may not be a fixed time. That is, the buffer time T0 may be calculated as a half time of the scheduled air-conditioning time T2.

In step S111, the air-conditioning operation is stopped. In other words, if the air-conditioning operation has not been performed, the stopped state is maintained, and if the air-conditioning operation has been started yet, the air-conditioning operation is stopped. In the air-conditioning stopped state, driving of the room fan 71 and the condenser fan 74 is stopped, and the clutch 75 is uncoupled to stop energization to the heater 77. In other words, the state in which energy consumption is reduced for all the devices used for air-conditioning operation is established. In the air-conditioning stopped state, energy consumption may not be reduced for all the devices used for air-conditioning operation. For example, only uncoupling of the clutch 75 that gives large effect of reducing the energy consumption may be performed. Also, only driving of the room fan 71 may be stopped while keeping the air-cooling preparation by the refrigerating cycle by making the clutch 75 in a coupling state, and rotating the condenser fan 74. After stopping the air-conditioning, the process proceeds to step S199 while the air-conditioning stopped state is maintained.

In step S108, whether the scheduled ride time T1 is longer than the scheduled air-conditioning time T2 is determined. When the scheduled ride time T1 is longer than the scheduled air-conditioning time T2, the process proceeds to step S151. On the other hand, when the scheduled ride time T1 is shorter than the scheduled air-conditioning time T2, the process proceeds to step S121.

In step S121, a preliminary air-conditioning operation before manned travel is performed during an early air-conditioning mode. The early air-conditioning mode is a mode in which air-conditioning is completed in a time shorter than the calculated scheduled air-conditioning time T2. In the early air-conditioning mode, the air-conditioning operation is performed in the internal air mode by taking in air through the internal air suction port. In the early air-conditioning mode, the number of revolutions of the room fan 71 is set to be higher than that in an energy saving air-conditioning mode. In the early air-conditioning mode, devices involved in the air-conditioning operation such as the room fan 71 are controlled to continuously operate without stopping the devices. That is, the operation time of the devices involved in the air-conditioning operation such as the room fan 71 is set to be longer than that in the energy saving air-conditioning mode.

The control content in the early air-conditioning mode is not limited to the method as described above. For example, in an air-conditioning apparatus having a plurality of the room fans 71, the number of operating room fans 71 may be increased in the early air-conditioning mode than in the energy saving air-conditioning mode. Alternatively, the number of revolutions of the compressor is set to be higher than that in the energy saving air-conditioning mode by setting the number of revolutions of the condenser fan 74 to be higher than that in the energy saving air-conditioning mode, and increasing the rotational speed of the engine 31. Alternatively, the output of the heater 77 may be set to be larger than that in the energy saving air-conditioning mode. After execution of the air-conditioning operation in the early air-conditioning mode, the process proceeds to step S199 while the air-conditioning operation is maintained.

In step S151, the preliminary air-conditioning operation before manned travel is performed in an energy saving air-conditioning mode which will be described later. After execution of the air-conditioning operation in the energy saving air-conditioning mode, the process proceeds to step S199 while the air-conditioning operation is maintained.

In step S199, the state parameters related with the air-conditioning control is stored. The state parameters to be stored includes the human body detection information, the pickup location information, the pickup time information, the scheduled ride time T1, the scheduled air-conditioning time T2, the air-conditioning mode under execution, a vehicle speed, a rotational speed of the engine 31, a temperature of engine cooling water, and an outside air temperature. The air-conditioning ECU 50 maintains the air-conditioning operation on the basis of the state parameters stored in step S199. Then, the process again returns to step S101, and the flow of air-conditioning control is repeated. In the flow of the second time or later, when the latest state parameters is newly acquired for example, in step S101, the air-conditioning control is conducted by using the latest state parameters in place of the stored state parameters. The stored state parameters is shared with the vehicle ECU 10, and also used for control such as travel control, other than the air-conditioning control.

Figure 3:
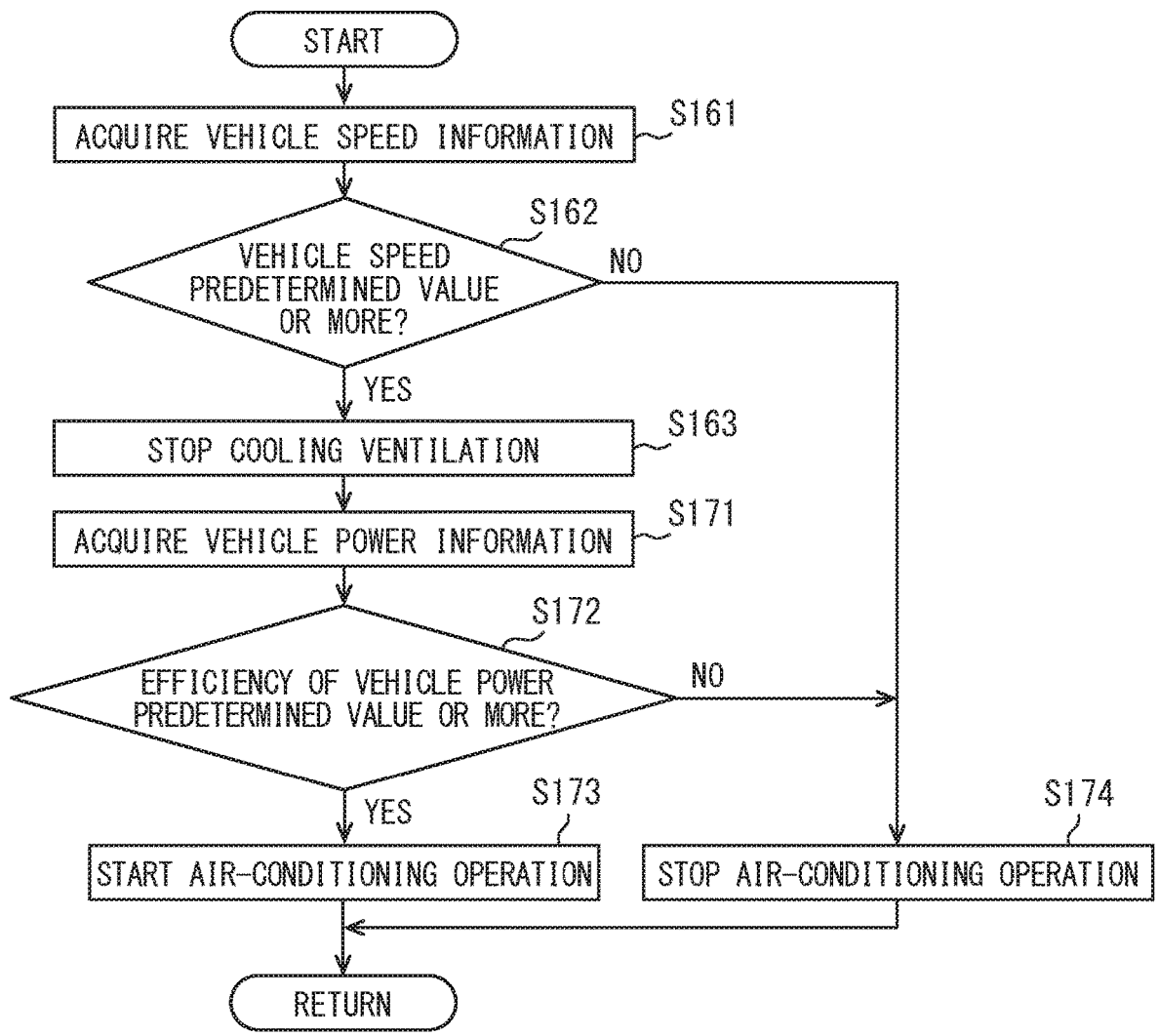
FIG. 3 is a flowchart of step S151 in the flowchart of FIG. 2.

Next, process of control by the vehicle air-conditioning apparatus 1 during the energy saving air-conditioning mode which is step S151 is described. In starting the operation in the energy saving air-conditioning mode in FIG. 3, first, vehicle speed information is acquired in step S161. The vehicle speed information is measured by the vehicle speed sensor 23. In step S162, whether the acquired vehicle speed is a predetermined value or more is determined. The predetermined value is, for example, 30 km per hour. When the vehicle speed is equal to or greater than the predetermined value, the process proceeds to step S163. On the other hand, when the vehicle speed is less than the predetermined value, the process proceeds to step S174. Here, the state that the vehicle is stopped is included in a case the vehicle speed is zero, and the vehicle speed is less than the predetermined value.

In step S163, cooling ventilation is stopped. In other words, driving of the engine radiator fan 36 and the condenser fan 74 is stopped. As a result, the engine radiator and the condenser are cooled while they receive only the traveling wind accompanying the traveling of the vehicle. Alternatively, the energy consumed by the fan may be reduced by decreasing the number of revolutions rather than by completely stopping the ventilation in step S163. After stopping driving of the fan, the process proceeds to step S171.

In step S171, the rotational speed of the engine 31 is acquired as vehicle power information. The rotational speed of the engine 31 is measured by electrically detecting and counting the voltage applied to the ignition coil. The state that the rotational speed of the engine 31 is low is the state that the cooling loss of the engine 31 is large and the efficiency is poor. The state that the rotational speed of the engine 31 is high is the state that the mechanical loss of the engine 31 is large, and the efficiency is poor. The state that the rotational speed of the engine 31 is moderate is the state in which the cooling loss and the mechanical loss are ameliorated in good balance and the efficiency is the best.

As the vehicle power information, the temperature of the engine 31 may be acquired. The temperature of the engine 31 is acquired by measuring the temperature of the engine cooling water using the first water temperature sensor 24. When the temperature of the engine cooling water is low, the efficiency of the engine 31 is low because warm-up has not completed and the combustion efficiency of gasoline is poor. When the temperature of the engine cooling water is high, the efficiency of the engine 31 is high because warm-up has completed and the combustion efficiency of gasoline is high. After acquiring the vehicle power information, the process proceeds to step S172.

In step S172, whether the efficiency of the vehicle power is high is determined. When determination is made on the basis of the rotational speed of the engine 31, whether the rotational speed of the engine 31 is in a moderate rotational speed region is determined. That is, when the rotational speed of the engine 31 is in a moderate rotational speed region, the efficiency of the engine 31 is determined to be a predetermined value or more. The moderate rotational speed region means a rotational speed region including the rotational speed capable of exerting the maximum efficiency ±500 rpm. Here, the maximum efficiency refers to the efficiency when the ratio of the output energy obtained as power to the input energy is the largest in the engine 31. Assuming that the rotational speed at which the maximum efficiency is obtained is 2000 rpm, the moderate rotational speed region is 1500 rpm to 2500 rpm. However, the rotational speed region where the efficiency of vehicle power is high is not limited to the above-described range as long as it is the rotational speed region including the rotational speed of the maximum efficiency.

When determination is made on the basis of the temperature of the engine 31, whether the temperature of the engine cooling water is a warm-up completion temperature or more is determined. That is, when the temperature of the engine cooling water is the warm-up completion temperature or more, the efficiency of the engine 31 is determined to be a predetermined value or more. The warm-up completion temperature is, for example, 80° C. The warm-up completion temperature can be such a degree of temperature that implies completion of warm-up, and may be determined as the state that the efficiency of the vehicle power is high at a temperature slightly lower than the warm-up completion temperature. When the efficiency of the vehicle power is the predetermined value or more, the process proceeds to step S173. On the other hand, when the efficiency of the vehicle power is less than the predetermined value, the process proceeds to step S174.

In step S173, an air-conditioning operation starts. In the energy saving air-conditioning mode, the driving time of the room fan 71 is made shorter than that in the manned air-conditioning mode to reduce the energy required for the air-conditioning operation as a total. Specifically, the room fan 71 is driven at a number of revolutions higher than the number of revolutions of the room fan 71 in the manned air-conditioning mode, and a large amount of air-conditioning wind is sent at once into the cabin.

In the energy saving air-conditioning mode, the air-conditioning operation is performed in the internal air mode of taking in air through the internal air suction port. The clutch 75 is brought into a coupling state to drive the compressor. Energization of the heater 77 is started. By adjusting the air mix door 73 to have an appropriate degree of opening, the cold wind and the warm wind are mixed to produce air-conditioning wind at a target temperature. When the target temperature of air-conditioning is low, the air-cooling operation may be performed only by the operation of the refrigerating cycle and the ventilation by driving of the compressor without energization of the heater 77. When the target temperature of air-conditioning is high, the heating operation may be performed only by the energization of the heater 77 and the ventilation without driving of the compressor. The process returns to the start of the energy saving air-conditioning mode while maintaining the air-conditioning operation, and repeats again the series of air-conditioning control.

In step S174, the air-conditioning operation is temporarily stopped. In the air-conditioning stopped state, driving of the room fan 71 is stopped, and the clutch 75 is uncoupled to stop energization to the heater 77. In other words, the air-conditioning stopped state is a state in which energy consumption is reduced for all the devices used for air-conditioning operation. In the air-conditioning stopped state, energy consumption may be reduced for a specific device rather than for all the devices used for air-conditioning operation.

According to the above-described embodiment, the air-conditioning operation is started in the unmanned traveling state in advance of manned travel, but the air-conditioning operation is not started while the vehicle is parked, namely the vehicle is not traveling in the unmanned state. Therefore, it is possible to cool the radiator such as a condenser by utilizing the traveling wind of the vehicle, and to reduce the energy consumption by driving the engine radiator fan 36 and the condenser fan 74. Further, since the vehicle power is not used for performing the air-conditioning operation while the vehicle is parked during which the vehicle power is not used for traveling, the energy consumption can be reduced. In other words, since there is no opportunity to drive the engine 31 only for the air-conditioning operation, the energy consumption can be reduced.

When the vehicle speed is a predetermined value or more, the air-conditioning operation accompanied by temperature adjustment is performed. Therefore, the air-conditioning operation consuming a lot of energy is performed while receiving plenty of traveling wind of the vehicle. Therefore, it is possible to reduce the energy consumption for driving the engine radiator fan 36 and the condenser fan 74, and it is possible to perform efficient air-conditioning. Further, since the engine 31 is not driven for the purpose of the air-conditioning operation while the vehicle is parked or traveling at low speed, the energy consumption can be reduced. When the efficiency of the vehicle power is a predetermined value or more, the air-conditioning operation accompanied by temperature adjustment is performed. Therefore, power of the air-conditioning operation can be ensured in the state where the efficiency of the engine 31 which is the vehicle power is high. Therefore, it is possible to reduce the energy consumed during the air-conditioning operation, and perform the air-conditioning efficiently.

In the manned air-conditioning mode, air-conditioning operation considering other factors of comfort such as noises besides the temperature is performed. This makes it possible to prevent deterioration in quietness due to the sound of the room fan 71. Therefore, it is possible to improve the comfort inside the cabin.

The seat heater is used only in the manned air-conditioning mode. In other words, the heating device that exerts high effect when an occupant is seated is not used during the unmanned state in which an occupant is not seated. Therefore, it is possible to efficiently perform the heating operation while reducing unnecessary energy consumption in the heating operation.

In the energy saving air-conditioning mode and the early air-conditioning mode, the number of revolutions of the room fan 71 is increased compared with that in the manned air-conditioning mode. This makes it possible to quickly achieve air-conditioning by increasing the amount of wind in the cabin in the unmanned state where there is no need of ensuring the quietness, and it is possible to make the temperature in the cabin approximate the target temperature quickly. Therefore, the total time of performing the air-conditioning operation can be reduced, and thus the energy consumed by the air-conditioning operation can be reduced.

The vehicle air-conditioning apparatus 1 performs the air-conditioning operation in the unmanned state on the basis of the ride schedule information indicating when the vehicle is expected to be the manned state. Therefore, it is possible to perform preliminary air-conditioning when air-conditioning is needed, and thus it is possible to reduce the consumed energy in comparison with a case where the air-conditioning operation is maintained as a preliminary air-conditioning state. Further, since the preliminary air-conditioning is performed before the vehicle gets into a manned state, it is possible to improve the comfort in the cabin when an occupant rides in the vehicle. Further, even when the scheduled ride time T1 is extended due to an unexpected event such as traffic jam, unnecessary preliminary air-conditioning is stopped, and an air-conditioning operation can be performed at the optimum timing for starting of the preliminary air-conditioning.

As the ride schedule information, the scheduled ride time T1 is calculated on the basis of the pickup location information and the current location, and the scheduled ride time T1 and the scheduled air-conditioning time T2 are compared to determine starting time of the preliminary air-conditioning. Therefore, it is possible to start the preliminary air-conditioning at an appropriate timing before the vehicle reaches the pickup location. Therefore, it is possible to improve the comfort of the occupant who rides in the cabin while controlling the energy consumed by the air-conditioning operation.

As the ride schedule information, the scheduled ride time T1 is calculated on the basis of the pickup time information and the current time, and the scheduled ride time T1 and the scheduled air-conditioning time T2 are compared to determine starting time of the preliminary air-conditioning. Therefore, it is possible to start the preliminary air-conditioning at an appropriate timing before the pickup time comes. Therefore, it is possible to improve the comfort of the occupant who rides in the cabin while controlling the energy consumed in the air-conditioning operation.

When the scheduled air-conditioning time T2 is expected to exceed the scheduled ride time T1, the preliminary air-conditioning is performed in the early air-conditioning mode. Therefore, it is possible to reduce the impairment in comfort in the cabin due to incompletion of the air-conditioning when the occupant rides in the vehicle.

Second Embodiment

This embodiment is a modified example based on the foregoing embodiment. In the present embodiment, after completion of manned travel, a ventilation operation is performed in an unmanned driving state. In other words, ventilation is performed in an unmanned state after a manned state and before the next manned state.

Figure 4:
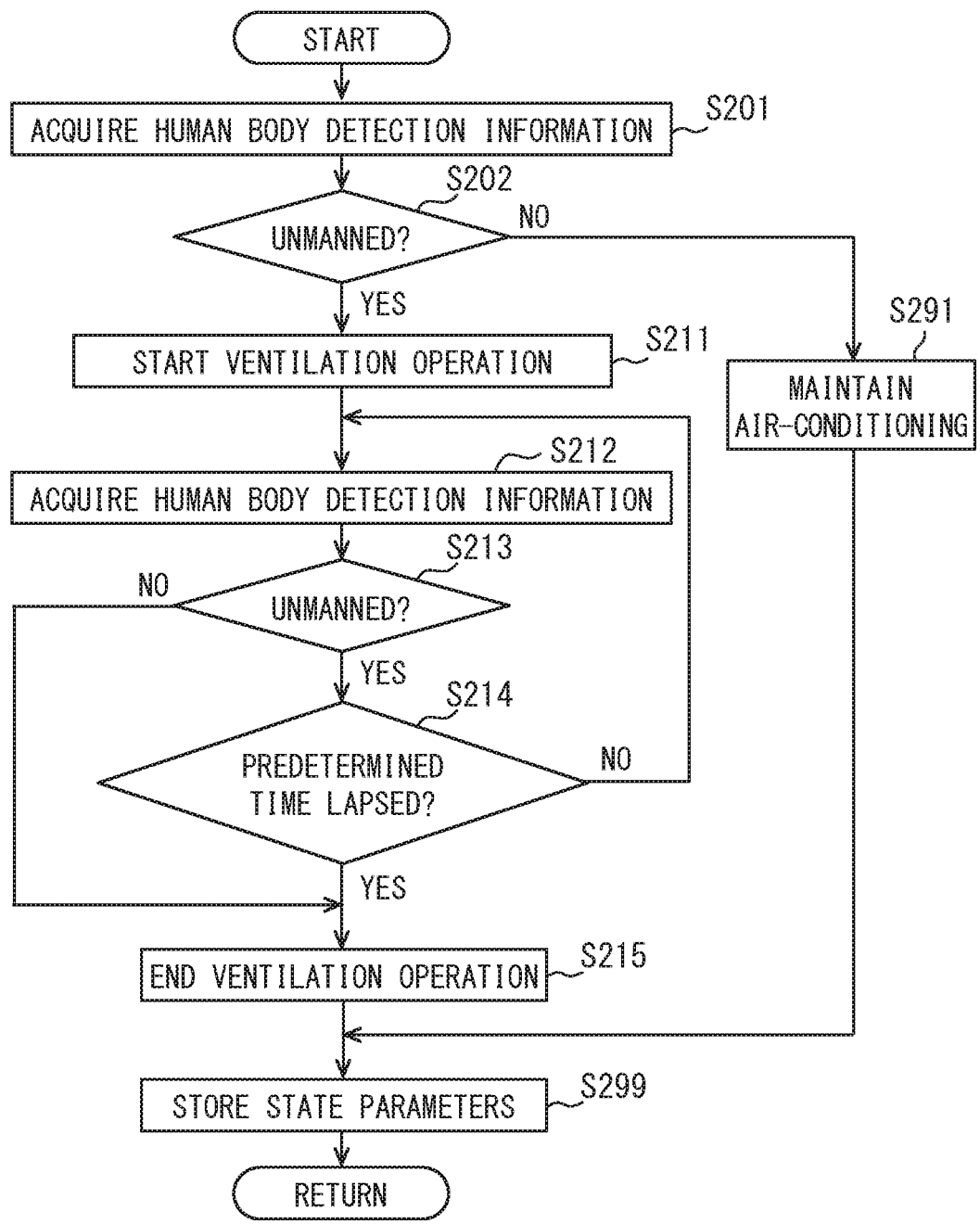
FIG. 4 is a flowchart regarding a ventilation operation of a second embodiment.

In FIG. 4, after completion of manned travel, presence or absence of a person in the cabin is detected by using the human body detecting sensor 22 in step S201. After detection of presence or absence of a person, whether the cabin is in an unmanned state is determined in step S202. When it is determined that the cabin is in the unmanned state, the process proceeds to step S211. On the other hand, when it is determined that the cabin is not in the unmanned state, the process proceeds to step S291.

In step S291, the current air-conditioning mode is maintained. That is, even after completion of manned travel, the current air-conditioning mode is maintained if the vehicle remains in the manned state. Therefore, when the vehicle is in an automated air-conditioning state in a manned air-conditioning mode, the state is maintained. On the other hand, when air-conditioning is modified by an occupant, the modification of air-conditioning by the occupant is maintained. Then, the process proceeds to step S299.

In step S211, a ventilation operation starts. In the ventilation operation, the suction port door 72 is switched to the external air mode, and the room fan 71 is driven, and the clutch 75 is uncoupled to stop energization to the heater 77. That is, the devices required for adjusting the temperature such as air-cooling or heating are brought into a state where the energy consumption is zero or small. In this manner, the external air is introduced into the cabin to replace the air inside the cabin. Further, much more external air may be taken into the cabin, for example, by opening the window 78. Alternatively, the ventilation operation may be performed in such a manner that the air in the cabin is discharged outside the cabin and the air outside the cabin is taken into the cabin only through the window 78 by opening the window 78 without driving the room fan 71. The process proceeds to step S212 while the ventilation operation is maintained.

In step S212, presence or absence of a person inside the cabin is detected by using the human body detecting sensor 22. After detection of presence or absence of a person, whether inside the cabin is in the unmanned state is determined in step S213. When it is determined as being in the unmanned state, the process proceeds to step S214 and the ventilation operation is continued. On the other hand, when it is determined as not being in the unmanned state, the process proceeds to step S215 and the ventilation operation ends.

In step S214, whether a predetermined time has elapsed in the ventilation operation state is determined. The predetermined time is, for example, 10 minutes. When the predetermined time has not elapsed yet, the flow returns to step S212 while the ventilation operation is continuing. That is, the ventilation operation continues as long as the cabin is in the unmanned state until the predetermined time has elapsed. On the other hand, when the predetermined time has elapsed, the process proceeds to step S215. Completion of the ventilation may be determined on the basis of other factor than the elapsed time. For example, the ventilation operation may continue until the difference in temperature between the outside temperature and the cabin inside temperature reduces to a predetermined value or less.

In step S215, a ventilation operation ends. That is, the suction port door 72 is switched to the internal air mode, and driving of the room fan 71 is stopped. When the window 78 is open, the window 78 is closed. Uncoupling of the clutch 75 and stopping of energization to the heater 77 are maintained. After end of the ventilation operation, the process proceeds to step S299.

In step S299, state parameters regarding the air-conditioning control is acquired. The state parameters to be stored is, for example, human body detection information, a elapsed time after completion of the ventilation operation, and the like. After end of the ventilation operation, the air-conditioning ECU 50 stops the air-conditioning operation until the next air-conditioning operation in a manned air-conditioning mode or preliminary air-conditioning before manned traveling. When the ventilation operation has not been performed for a predetermined time from the previous ventilation operation, the ventilation operation may be compulsorily performed in an unmanned state. For example, when the ventilation operation has not been performed for 24 hours from the previous ventilation operation, the ventilation operation may be compulsorily performed. Also, the ventilation operation may be performed several times during the period from the last manned state to the next manned state.

According to the above-described embodiment, the ventilation operation starts when the vehicle is in the unmanned state. More preferably, the ventilation operation starts after the manned state is changed to the unmanned state. In other words, the ventilation operation is performed in the unmanned state after the manned state ends and before the next manned state. Therefore, the ventilation operation can eliminate the state that the odor generated in the manned state fills inside the cabin, or the state that the humidity inside the cabin is high. Therefore, it is possible to let the next occupant ride after the cabin space is made comfortable. Also, it is possible to prevent the odor from being fixed to the parts such as seats constituting the cabin. Also, it is possible to prevent growth of mold due to retention of the high humid state. Also, it is possible to remove viruses and so on taken into the cabin by an occupant. Therefore, it is easy to keep a hygienic cabin environment.

The ventilation operation is performed in an unmanned state. Therefore, it is possible to prevent the impairment in comfort in the cabin space due to temporal approximation of the cabin inside temperature to the outside temperature in association with the ventilation operation, from influencing on an occupant.

When the vehicle gets into a manned state during the ventilation operation, the ventilation operation is ended. Therefore, it is possible to rapidly transit to the air-conditioning control adapted to the manned state. Therefore, it is possible to reduce the time during which the comfort inside the cabin is low although there is an occupant in the vehicle.

The ventilation operation is performed before preliminary air-conditioning operation in an unmanned state. Therefore, it is possible to prevent the air-conditioned air from exiting the vehicle for ventilation due to the need of ventilation after preliminary air-conditioning. Therefore, preliminary air-conditioning can be performed at an appropriate timing after ventilation, so that it is possible to reduce the energy consumed by air-conditioning.

The ventilation operation may not be performed directly after the manned state changes to the unmanned state. That is, the ventilation operation may be performed directly before performing an air-conditioning operation involving the temperature adjustment as preliminary air-conditioning. According to this, since it is possible to introduce fresh air inside the cabin directly before the air-conditioning operation involving the temperature adjustment, it is easy to keep the cabin space in a comfortable condition for a long time.

The ventilation operation may be executed in a manned state. That is, the ventilation operation may be executable by an operation of an occupant. As a result, it is possible to perform ventilation by an air-conditioning operation by an occupant when the ventilation is insufficient, or when inside the cabin is filled with odor after ventilation. Therefore, it is possible to make the cabin space comfortable.

Third Embodiment

This embodiment is a modified example based on the foregoing embodiment. In this embodiment, a motor 332 in place of the engine 31 is used as the vehicle power. That is, the vehicle air-conditioning apparatus 1 is mounted on a vehicle such as an electric car using the motor 332 as a vehicle power.

Figure 5:
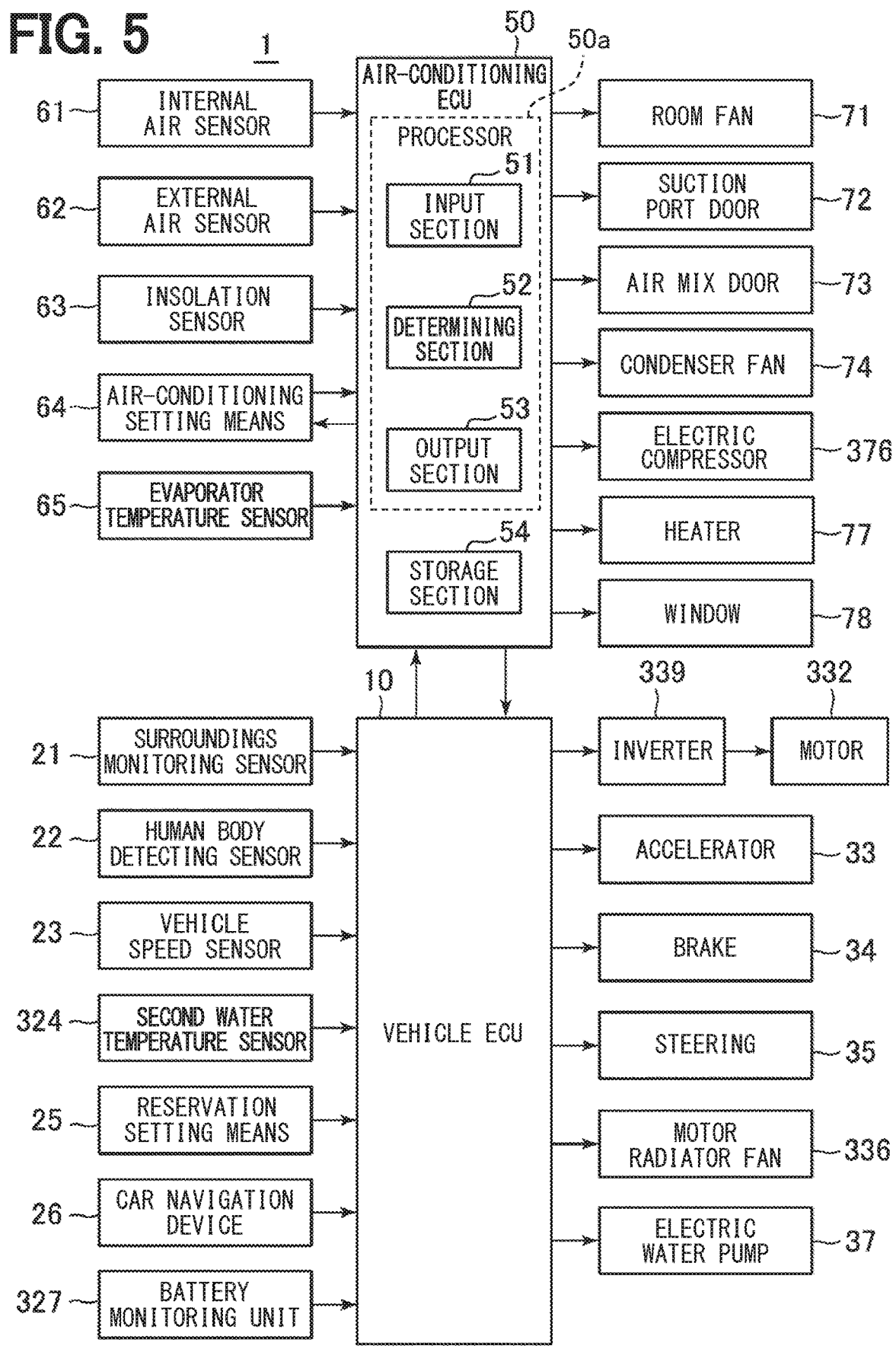
FIG. 5 is a block diagram of a vehicle air-conditioning apparatus of a third embodiment.

In FIG. 5, the vehicle ECU 10 is connected to a second water temperature sensor 324 rather than the first water temperature sensor 24. The second water temperature sensor 324 is a temperature sensor disposed in a circulating path of the cooling water that cools the heat generating components such as the motor 332, an inverter 339 and a battery. The second water temperature sensor 324 detects the temperature of the cooling water directly after the temperature rises by heat exchange with the motor 332.

The vehicle ECU 10 is connected with a battery monitoring unit 327. The battery monitoring unit 327 is a unit of monitoring the battery that supplies electric components such as the motor 332 with electric power. The battery monitoring unit 327 detects the amount of electricity stored in the battery. The vehicle ECU 10 takes out electricity from the battery at the time of acceleration, and drives the motor 332. On the other hand, power is generated in the motor 332 at the time of deceleration and the electricity is stored in the battery.

The vehicle ECU 10 is connected with the motor 332 via the inverter 339 rather than the engine 31. The inverter 339 is a device that converts the direct current to the alternate current. The motor 332 is vehicle power for the vehicle to travel. The motor 332 converts the electric energy supplied from the battery to the mechanical energy.

The vehicle ECU 10 is connected with a motor radiator fan 336 rather than the engine radiator fan 36. The motor radiator fan 336 is an air blower that provides air to the motor radiator which is a radiator in which the cooling water that cools the motor 332 and the like circulates. The motor radiator fan 336 is provided in front of the motor radiator disposed in a front part of the vehicle. In other words, the motor radiator fan 336 is disposed facing the motor radiator. The motor radiator fan 336 sends air from the front part toward the rear part of the vehicle. In other words, the air is sent in the same direction as the direction of the wind received by the traveling vehicle.

The air-conditioning ECU 50 is connected with an electric compressor 376 rather than the clutch 75. The electric compressor 376 is a compressor constituting the refrigerating cycle for air-cooling. The electric compressor 376 is controlled by the air-conditioning ECU 50 regarding on/off of its driving and the intensity of the output. Driving of the electric compressor 376 is independent of driving of the motor 332. That is, vehicle power is not used for the control related with air-conditioning operation. When an air-cooling operation is performed, the electric compressor 376 is driven to supply the evaporator with a coolant.

Figure 6:
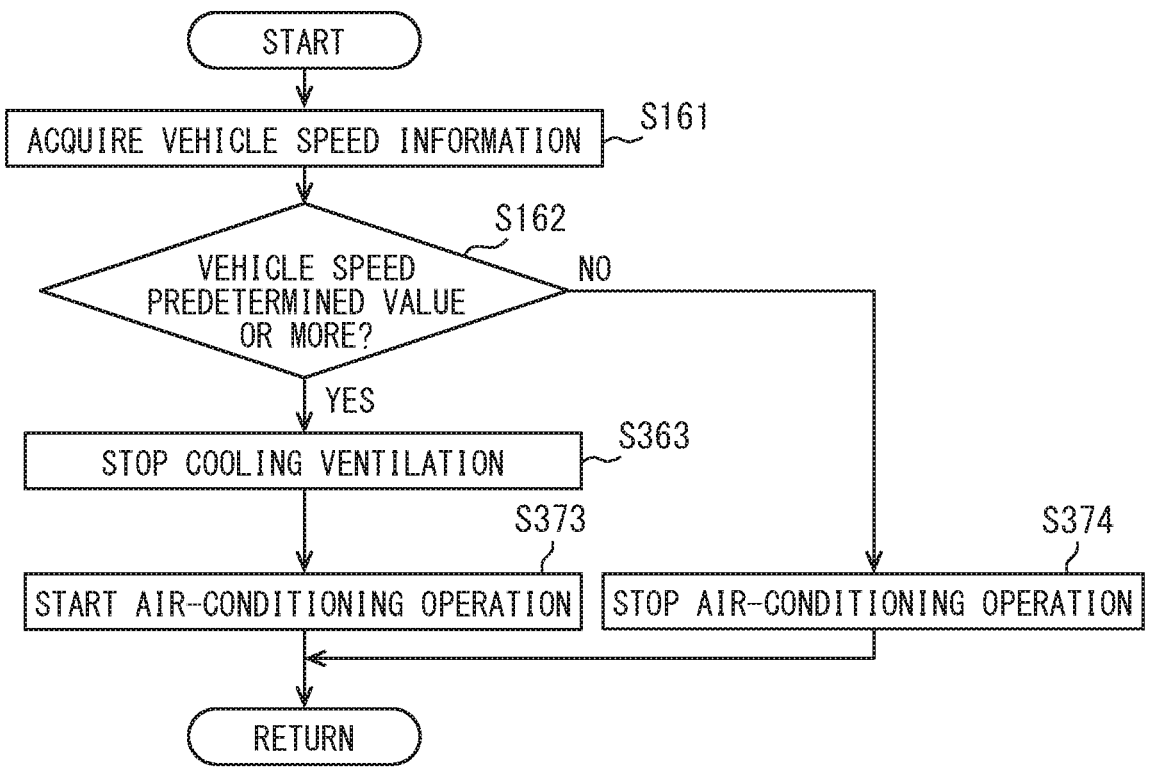
FIG. 6 is a flowchart regarding control of the third embodiment.

In FIG. 6, the step denoted by the same step number as that in the foregoing embodiment indicates the similar processing, and the same effects are exerted. In the following, the content different from that in the foregoing embodiment is described.

In step S162 in the energy saving air-conditioning mode, whether the acquired vehicle speed is a predetermined value or more is determined. The predetermined value is, for example, 30 km per hour. When the vehicle speed is the predetermined value or more, the process proceeds to step S363. On the other hand, when the vehicle speed is lower than the predetermined value, the process proceeds to step S374. Here, the state where the vehicle is stopped is included in the case where the vehicle speed is less than the predetermined value.

In step S363, cooling ventilation is stopped. In other words, driving of the motor radiator fan 336 and the condenser fan 74 is stopped. As a result, the motor radiator and the condenser are cooled while they receive only the traveling wind accompanying the traveling of the vehicle. The energy consumed by the air blower may be reduced by decreasing the number of revolutions rather than by completely stopping the ventilation in step S363. After stopping driving of the fan, the process proceeds to step S373.

In step S373, an air-conditioning operation starts. Specifically, the room fan 71 is driven at a number of revolutions higher than the number of revolutions of the room fan 71 in the manned air-conditioning mode. Also, the electric compressor 376 is driven. Alternatively, energization of the heater 77 may start. By appropriately adjusting the opening degree of the air mix door 73, the cold wind and the warm wind are mixed to produce air-conditioning wind at a target temperature. The process returns to the start of the energy saving air-conditioning mode while maintaining the air-conditioning operation, and repeats again the series of air-conditioning control.

In step S374, the air-conditioning operation is temporarily stopped. In the air-conditioning stopped state, driving of the room fan 71 is stopped, and energization to the electric compressor 376 and the heater 77 is stopped. In other words, the air-conditioning stopped state is a state in which energy consumption is reduced for all the devices used for air-conditioning operation. In the air-conditioning stopped state, energy consumption may be reduced for a specific device rather than for all the devices used for air-conditioning operation. That is, driving may be stopped for the two devices used for adjusting the temperature, i.e., the electric compressor 376 and the heater 77, and driving may be continued for other devices. The process returns to the start of the energy saving air-conditioning mode while maintaining this stopped state, and repeats again the series of air-conditioning control.

According to the above-described embodiment, the preliminary air-conditioning operation before manned travel is not performed while the vehicle is parked, namely the vehicle is not traveling in the unmanned state. Therefore, it is possible to achieve cooling by utilizing the traveling wind of the vehicle, and to reduce the energy consumption by driving the motor radiator fan 336 and the condenser fan 74.

When the vehicle speed is a predetermined value or more, the air-conditioning operation accompanied by temperature adjustment is performed. Therefore, at the timing of receiving plenty of traveling wind of the vehicle, the air-conditioning operation consuming a lot of energy is performed. Therefore, it is possible to reduce the energy consumption by driving the motor radiator fan 336 and the condenser fan 74, and it is possible to perform efficient air-conditioning.

Figure 7:
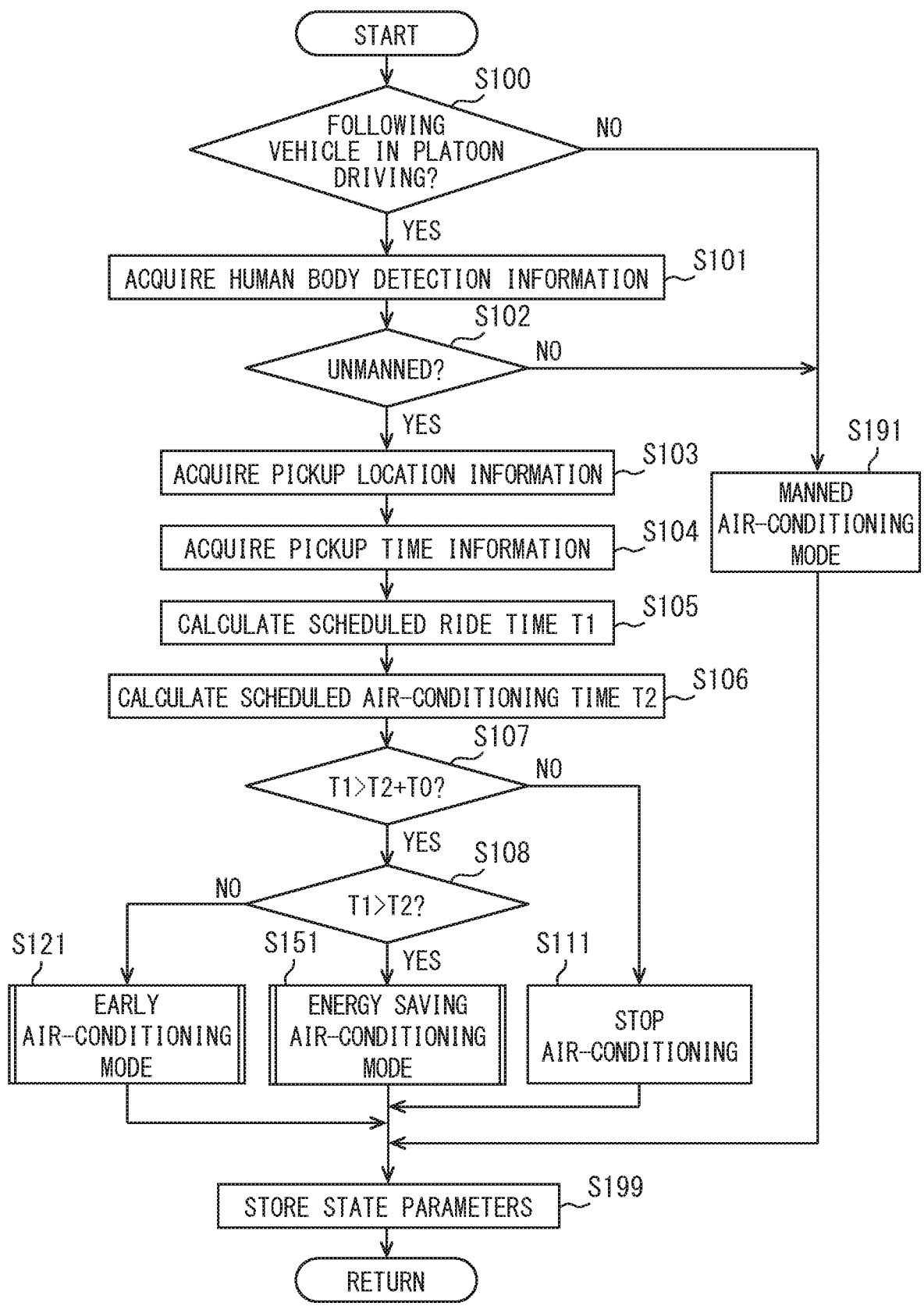
FIG. 7 is a modified example of the flowchart shown in FIG. 2.

The flowchart shown in FIG. 7 is a modified example of the flowchart shown in FIG. 2. As shown in FIG. 7, whether the subject vehicle is a following vehicle in vehicle platooning is determined as step S100 before step S101. Being a following vehicle in a vehicle platooning indicates the situation where the subject vehicle is driving in a platoon but is not a leading vehicle of the platoon driving. When the subject vehicle is a following vehicle in platoon driving, the process proceeds to step S101, and when the subject vehicle is not a following vehicle in platoon driving, the process proceeds to step S191. The process from step S101 is the same as that in FIG. 2, and hence the description is omitted.

Fourth Embodiment

Figure 8:
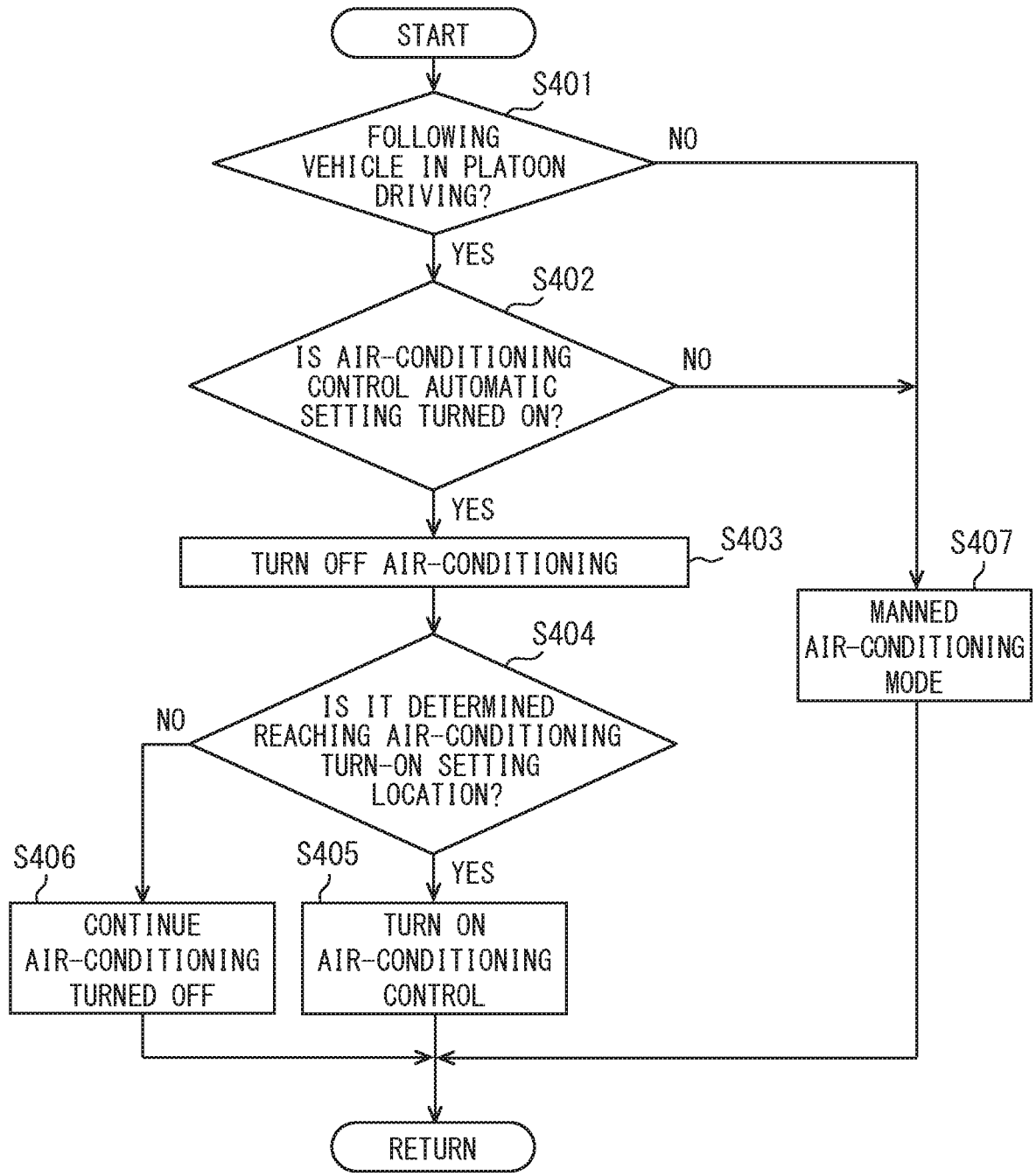
FIG. 8 is a flowchart regarding control of a fourth embodiment.

A mode of determining whether the subject vehicle is a following vehicle in platoon driving is now described by referring to FIG. 8. In step S401, whether the subject vehicle is a following vehicle in platoon driving is determined. When the subject vehicle is a following vehicle in platoon driving, the process proceeds to step S402, and when the subject vehicle is not a following vehicle in platoon driving, the process proceeds to step S407.

In step S402, whether an air-conditioning control automatic setting is ON is determined. The air-conditioning control automatic setting is the setting of autonomously executing an air-conditioning control according to the location of the subject vehicle, the scheduled traveling time, and the like. When the air-conditioning control automatic setting is ON, the process proceeds to step S403. When the air-conditioning control automatic setting is not ON, the process proceeds to step S407.

In step S403, air-conditioning is temporarily turned OFF. In step S404 following step S403, whether the vehicle has reached the location where air-conditioning is to be turned ON is determined on the basis of navigation information. When the vehicle has reached the location where air-conditioning is to be turned ON, the process proceeds to step S405, and when the vehicle has not reached the location where air-conditioning is to be turned ON, the process proceeds to step S406.

In step S405, an air-conditioning control starts. In step S406, OFF of air-conditioning is continued. In step S407, the mode is switched to a manned air-conditioning mode. Since the details of the manned air-conditioning mode has been already described in step S191 of FIG. 2, the detailed description thereof is omitted. On end of the process at steps S405, S406, S407, the flow returns.

Figure 9:
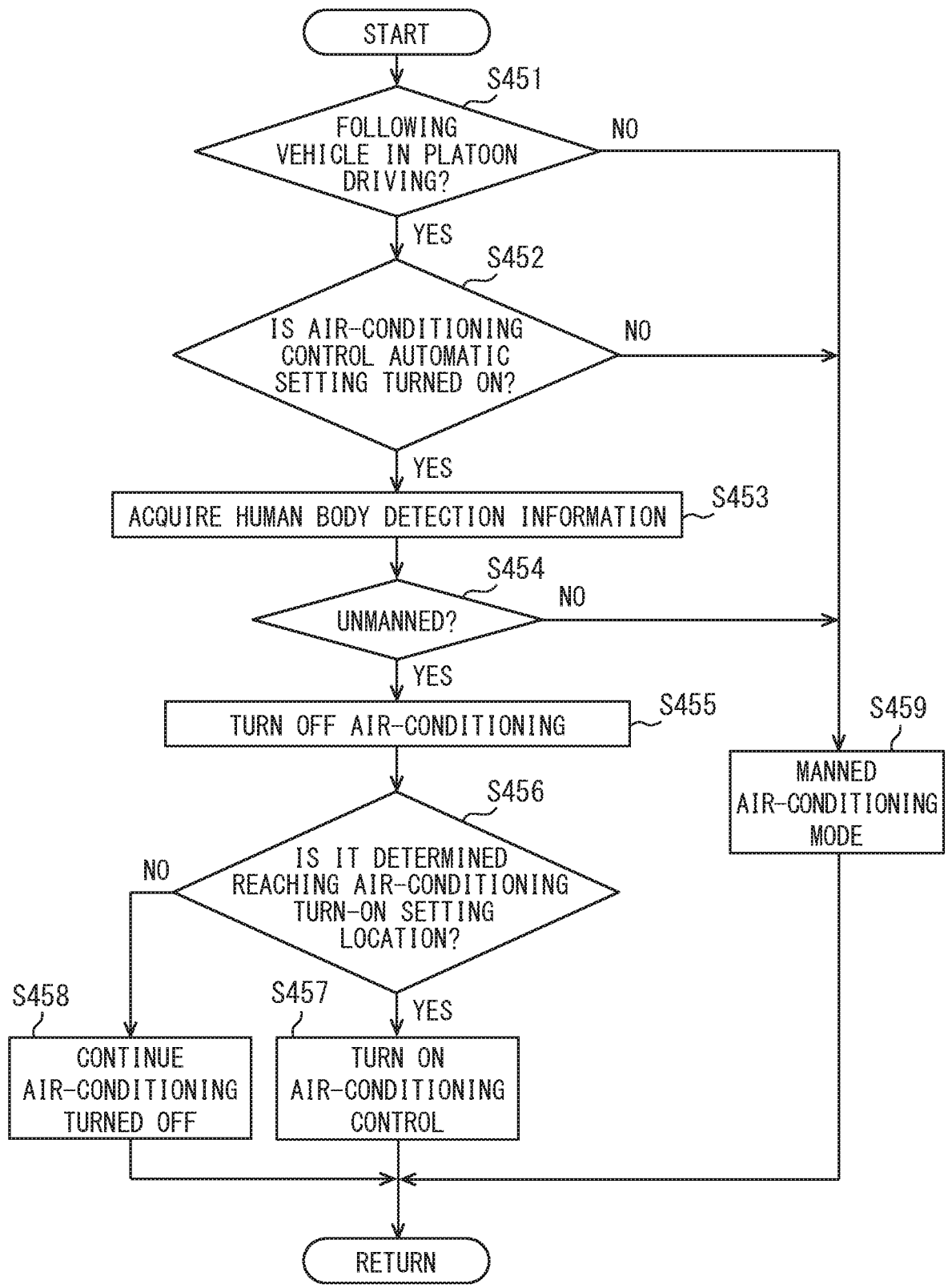
FIG. 9 is a flowchart regarding control of the fourth embodiment.

Another example of determining whether the subject vehicle is a following vehicle in platoon driving is now described by referring to FIG. 9. The example shown in FIG. 9 uses navigation information, and is capable of preventing erroneous operation due to erroneous setting.

In step S451, whether the subject vehicle is a following vehicle in platoon driving is determined. When the subject vehicle is a following vehicle in platoon driving, the process proceeds to step S452, and when the subject vehicle is not a following vehicle in platoon driving, the process proceeds to step S459.

In step S452, whether an air-conditioning control automatic setting is ON is determined. When the air-conditioning control automatic setting is ON, the process proceeds to step S453. When the air-conditioning control automatic setting is ON, the process proceeds to step S459.

In step S453, human body detection information is acquired. Since acquisition of human body detection information has been already described in step S101 of FIG. 2, the detailed description thereof is omitted. In step S454 following step S453, whether the subject vehicle is in the unmanned state is determined. When the subject vehicle is in the unmanned state, the process proceeds to step S455, and when the subject vehicle is not in the unmanned state, the process proceeds to step S459.

In step S455, air-conditioning is temporarily turned OFF. In step S456 following step S455, whether the vehicle has reached the location where air-conditioning is to be turned ON is determined on the basis of navigation information. When the vehicle has reached the location where air-conditioning is to be turned ON, the process proceeds to step S457, and when the vehicle has not reached the location where air-conditioning is to be turned ON, the process proceeds to step S458.

In step S457, an air-conditioning control starts. In step S458, the OFF state of air-conditioning is continued. In step S459, the mode is switched to a manned air-conditioning mode. On end of the processing of steps S457, S458, S459, the flow returns.

In the example shown in FIG. 9, since whether the subject vehicle is in the unmanned state is determined in step S454, it is possible to execute an air-conditioning control in a manned air-conditioning mode, for example, even when the subject vehicle is in the manned state, and the air-conditioning control automatic setting is turned ON.

Figure 10:
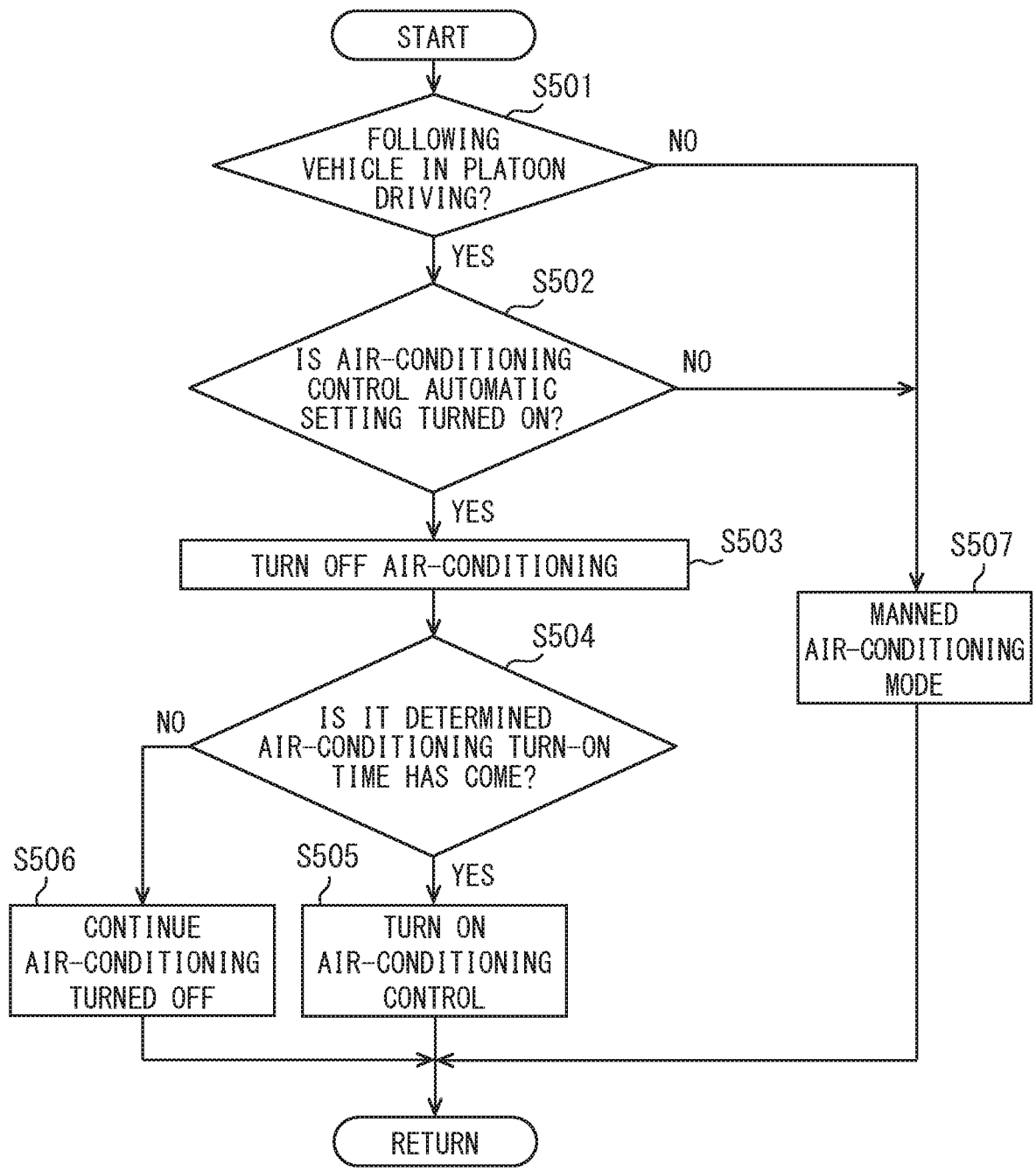
FIG. 10 is a flowchart regarding control of the fourth embodiment.

Another example of determining whether the subject vehicle is a following vehicle in platoon driving is now described by referring to FIG. 10. The example shown in FIG. 10 is an example of using time information by a timer.

In step S501, whether the subject vehicle is a following vehicle in platoon driving is determined. When the subject vehicle is a following vehicle in platoon driving, the process proceeds to step S502, and when the subject vehicle is not a following vehicle in platoon driving, the process proceeds to step S507.

In step S502, whether an air-conditioning control automatic setting is ON is determined. When the air-conditioning control automatic setting is ON, the process proceeds to step S503. When the air-conditioning control automatic setting is ON, the process proceeds to step S507.

In step S503, air-conditioning is temporarily turned OFF. In step S504 following step S503, whether the time to turn ON air-conditioning has come is determined on the basis of timer information. When the time to turn ON air-conditioning has come, the process proceeds to step S505, and when the time to turn ON air-conditioning has not come, the process proceeds to step S506.

In step S505, an air-conditioning control starts. In step S506, the OFF state of air-conditioning is continued. In step S507, the mode is switched to a manned air-conditioning mode. On end of the processing of steps S505, S506, S507, the flow returns.

By incorporating the step of determining whether the subject vehicle is in the unmanned state in the same manner as in the flowchart of FIG. 9, it is possible to execute an air-conditioning control in a manned air-conditioning mode, for example, even when the subject vehicle is in a manned state, and the air-conditioning control automatic setting is turned ON.

In all of the above embodiments, the unmanned state includes various modes of unmanned driving. For example, the mode of automatically asking the vehicle to come from a parking space, and performing unmanned drive to a location where an occupant rides is also included.

Other Embodiments

The disclosure in this description is not limited to the illustrated embodiments. The disclosure encompasses the illustrated embodiments and modified forms based on the embodiments made by a person skilled in the art. For example, the disclosure is not limited to combinations of components and/or elements indicated in embodiments. The disclosure can be practiced in various combinations. The disclosure may include an additional part that can be added to embodiments. The disclosure encompasses those in which components and/or elements in embodiments are omitted. The disclosure encompasses replacements or combinations of components and/or elements between one embodiment and the other embodiment. The disclosed technical ranges are not limited by the description of embodiments. It should be understood that some disclosed technical ranges are indicated by description of claims, and includes every modification within the equivalent meaning and the scope of description of claims.

Description has been made for two types of vehicles, namely, a vehicle equipped with an engine, and a vehicle equipped with a motor, the vehicle air-conditioning apparatus 1 may be applied to, for example, a hybrid car that travels differently using the two types of vehicle power, namely the engine and the motor.

The invention claimed is:

1. An air-conditioning control apparatus that is mounted in a vehicle capable of unmanned driving, the apparatus comprising:
   a determining section that is configured to determine whether an occupant is in the vehicle; and
   an output section that is configured to execute an air-conditioning control based on a determination result by the determining section, wherein
   the output section is configured to execute the air-conditioning control based on ride schedule information indicating a length of time until the occupant rides in the vehicle when the determination result by the determining section indicates the vehicle is in an unmanned state, and
   the output section is configured to execute the air-conditioning control when the vehicle is in a vehicle platooning and is a following vehicle in the vehicle platooning that is not a leading vehicle.

2. The air-conditioning control apparatus according to claim 1, wherein
   the output section is configured to execute the air-conditioning control when the determination result by the determining section indicates the vehicle is in the unmanned state before the occupant rides in the vehicle.

3. The air-conditioning control apparatus according to claim 1, wherein
   the ride schedule information includes a scheduled ride time that is calculated based on current location information of the vehicle and pickup location information indicating a location where the occupant intends to ride in the vehicle, and
   the determining section configured to calculate a scheduled air-conditioning time required to complete an air-conditioning and determine starting time of the air-conditioning control based on the scheduled ride time and the scheduled air-conditioning time.

4. The air-conditioning control apparatus according to claim 1, wherein
   the ride schedule information includes a scheduled ride time that is calculated based on a current time and pickup time information indicating a time when the occupant intends to ride in the vehicle, and
   the determining section is configured to calculate a scheduled air-conditioning time required to complete the air-conditioning and determine starting time of the air-conditioning control based on the scheduled ride time and the scheduled air-conditioning time.

5. The air-conditioning control apparatus according to claim 3, wherein
   the output section is configured to perform an early air-conditioning mode by executing the air-conditioning control so that the air-conditioning is completed for a time shorter than the scheduled air-conditioning time when the determining section determines that the scheduled air-conditioning time exceeds the scheduled ride time.

6. An air-conditioning control apparatus that is mounted in a vehicle capable of unmanned driving, the apparatus comprising
   a processor programmed to:
   determine whether an occupant is in the vehicle;

execute an air-conditioning control based on ride schedule information indicating a length of time until the occupant rides in the vehicle upon determining that the occupant is not in the vehicle;

determine whether the vehicle is a following vehicle in a vehicle platooning that is not a leading vehicle of the vehicle platooning; and execute the air-conditioning control upon determining that the vehicle is the following vehicle in the vehicle platooning.

7. The air-conditioning control apparatus according to claim 6, wherein the processor is further programmed to execute the air-conditioning control upon determining that the vehicle is in an unmanned state before the occupant rides in the vehicle.

8. The air-conditioning control apparatus according to claim 6, wherein the ride schedule information includes a scheduled ride time that is calculated based on current location information of the vehicle and pickup location information indicating a location where the occupant intends to ride in the vehicle, and the processor is further programmed to calculate a scheduled air-conditioning time required to complete an air-conditioning and determine starting time of the air-conditioning control based on the scheduled ride time and the scheduled air-conditioning time.

9. The air-conditioning control apparatus according to claim 6, wherein the ride schedule information includes a scheduled ride time that is calculated based on a current time and pickup time information indicating a time when the occupant intends to ride in the vehicle, and the processor is further programmed to calculate a scheduled air-conditioning time required to complete the air-conditioning and determine starting time of the air-conditioning control based on the scheduled ride time and the scheduled air-conditioning time.

10. The air-conditioning control apparatus according to claim 8, wherein the processor is further programmed to:

determine whether the scheduled air-conditioning time exceeds the scheduled ride time; and perform an early air-conditioning mode by executing the air-conditioning control so that the air-conditioning is completed for a time shorter than the scheduled air-conditioning time upon determining that the scheduled air-conditioning time exceeds the scheduled ride time.

* * * * *